United States Patent [19]

Schläfer et al.

[11] Patent Number: 6,113,657
[45] Date of Patent: *Sep. 5, 2000

[54] PURIFICATION OF CAUSTIC SODA

[75] Inventors: Dieter Schläfer, Ludwigshafen; Michael Mauss, Neustadt; Matthias Rauls, Limburgerhof; Dieter Baumann, Frankenthal, all of Germany

[73] Assignee: BASF Aktiengesellschaft, Ludwigshafen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/041,691

[22] Filed: Mar. 13, 1998

[30] Foreign Application Priority Data

Mar. 13, 1997 [DE] Germany ............................ 197 10 449

[51] Int. Cl.$^7$ ....................................... C01D 1/30
[52] U.S. Cl. .......................... 23/302 T; 23/301; 423/641; 423/184
[58] Field of Search .................. 23/302 T, 301, 23/295 R; 423/641, 179, 184

[56] References Cited

U.S. PATENT DOCUMENTS

Re. 30,411  10/1980  Nakaya et al. .................. 23/302 T
3,922,154   11/1975  Kawasaki et al. ................ 23/302 T
3,983,215    9/1976  Hirata et al. ................... 423/641
4,676,971    6/1987  Cooper et al. .................. 423/641

FOREIGN PATENT DOCUMENTS 24 25 282     2/1975   Germany .
24 34 447     2/1975   Germany .
26 18 242    11/1976   Germany .
54-131595    10/1979   Japan ............................ 23/301
1427310      10/1976   United Kingdom ............ 23/302 T
1 471 008     4/1977   United Kingdom .
1 486 407     9/1977   United Kingdom .

Primary Examiner—Ngoc-Yen Nguyen
Attorney, Agent, or Firm—Keil & Weinkauf

[57] ABSTRACT

In a process for preparing crystalline NaOH.3.5H$_2$O, NaOH.3.5H$_2$O is allowed to crystallize from an aqueous sodium hydroxide solution which contains sodium chloride and is saturated in respect of NaOH.3.5H$_2$O and the crystals formed are separated from the solution using a mechanical solid/liquid separation apparatus, wherein the solid/liquid separation is carried out under conditions under which the crystalline NaOH.3.5H$_2$O is freed sufficiently of residual solution adhering to the surface for the sodium chloride content of the crystalline NaOH.3.5H$_2$O obtained to be less than 100 mg per kg. The crystalline NaOH.3.5H$_2$O is subjected to an additional purification step, which may include the at least superficial melting or the at least superficial dissolution of the crystals, in combination with a solid/liquid separation step. The additional purification step. The additional purification step comprises washing the crystalline NaOH.3.5H$_2$O separated off.

9 Claims, No Drawings

PURIFICATION OF CAUSTIC SODA

BACKGROUND OF THE INVENTION

The present invention relates to a process for purifying caustic soda by separating off sodium hydroxide in the form of crystalline $NaOH.3.5H_2O$. In particular, the invention relates to a process for isolating particularly 63 pure crystalline $NaOH.3.5H_2O$ from a crude sodium hydroxide solution containing soluble impurities such as sodium chloride or sodium chlorate, as is obtained from the electrolytic diaphragm process.

The industrial production of NaOH by electrolytic decomposition of an aqueous sodium chloride solution (chlor-alkali electrolysis) is nowadays carried out predominantly by two processes. In the amalgam process, use is made of a mercury cathode on which the sodium metal is deposited to form an amalgam. Subsequent decomposition of the sodium amalgam with water gives an essentially chloride-free sodium hydroxide solution. A problem in this process is the use of mercury as cathode material, which requires particular measures for preventing environmental pollution by mercury.

In addition, the diaphragm process is used on a large scale. In this process the electrolysis cell is divided into anode and cathode compartments by a porous diaphragm. In the cathode compartment, liberation of hydrogen at a steel cathode gives a solution having an NaOH content of customarily from 130 to 150 g/l and an NaCl content of from 175 to 210 g/l as cathode liquor or cell liquor. This cell liquor is subsequently concentrated with precipitation of salt to give a 50% by weight strength sodium hydroxide solution. This leaves a high residual sodium chloride content of about 1% by weight in the alkali. Furthermore, components of the alkali solution formed in the cathode compartment during the electrolysis can diffuse through the porous diaphragm into the anode compartment and react with the chlorine gas formed at the anode to give sodium hypochlorite. Sodium hypochlorite formed in this way subsequently decomposes by disproportionation into sodium chloride and sodium chlorate, as a result of which the caustic soda obtained in the diaphragm process can also contain up to 1.6 g/kg of sodium chlorate as impurity. However, this high content of corrosive impurities interferes in many applications.

A known method of purifying diaphragm caustic soda is the extraction of sodium chloride with liquid ammonia, which allows the NaCl content of the alkali to be reduced to about 0.08% by weight. This process has high capital and operating costs.

The purification of diaphragm alkali is preferably carried out by separating off NaOH in the form of crystalline sodium hydroxide hydrates. DE-A 26 18 242 describes a process for purifying caustic soda by separating off sodium hydroxide as sodium hydroxide dihydrate ($NaOH.2H_2O$). Cooling an NaCl-containing, about 50% by weight strength crude sodium hydroxide solution forms a slurry comprising $NaOH.2H_2O$ crystals and fine NaCl crystals. From this slurry, the fine impurity crystals are removed by flotation with adsorption onto bubbles which are formed by vaporization of a dissolved coolant or by passing a gas into the slurry. Owing to the necessity of separating the sodium hydroxide dihydrate crystals from sodium chloride crystals which are precipitated simultaneously, this purification process is technically complicated and, in addition, requires the undesirable use of CFCs, or instead the use of flammable gases such as butane which requires strict safety precautions, as coolant and flotation agent.

In further known methods of purifying NaOH, sodium hydroxide is separated off as the 3.5-hydrate ($NaOH.3.5H_2O$), avoiding a coprecipitation of NaCl. Crystalline $NaOH.3.5H_2O$ is stable in the range from 5° C. to 15.5° C. in NaOH solution having a concentration of from 33% to 45% by weight. In the absence of seed crystals, such a 33–45% by weight strength NaOH solution can be supercooled to up to 20° C. below its saturation point without crystallization occurring. The crystallization of $NaOH.3.5H_2O$ from such a supersaturated solution is usually induced by means of seed crystals. After precipitation, the crystallized material can be separated from the mother liquor of the crystallization by means of a mechanical solid/liquid separation.

DE-A-24 26 282 describes a process in which a 33–45% by weight strength aqueous NaOH solution which has been obtained by concentrating the cell liquor obtained in the diaphragm process is cooled to below the saturation point of $NaOH.3.5H_2O$ and crystalline NaCl which precipitates is separated off. $NaOH.3.5H_2O$ is crystallized from the homogeneous supersaturated NaOH solution thus obtained by introducing $NaOH.3.5H_2O$ seed crystals without further external cooling. During this procedure, the mixture is warmed to the saturation temperature of the solution in respect of $NaOH.3.5H_2O$ by the heat of crystallization or by external heating. The crystalline $NaOH.3.5H_2O$ which precipitates is finally, when the saturation temperature is reached, separated off by means of a centrifugal separator.

DE-A-24 34 447 describes a variant of this process in which the crystallization of $NaOH.3.5H_2O$ is carried out at constant temperature with removal of the heat of crystallization.

The last two processes achieved NaCl contents of less than 1.5 g per kg of $NaOH.3.5H_2O$, the minimum NaCl content was 400 mg/kg. No statements are made regarding the content of other impurities such as sodium chlorate.

A disadvantage of both processes is the NaCl content of the caustic soda obtained which is still high in comparison with caustic soda from the amalgam process.

BRIEF SUMMARY OF THE INVENTION

It is an object of the present invention to provide a process for purifying alkali from the diaphragm process to give crystalline $NaOH.3.5H_2O$ having a particularly low content of sodium chloride.

We have found that this object is achieved, starting from the known method of preparing crystalline $NaOH.3.5H_2O$ in which $NaOH.3.5H_2O$ is allowed to crystallize from an aqueous sodium hydroxide solution which contains sodium chloride and is saturated in respect of $NaOH.3.5H_2O$ and the crystals formed are separated from the solution using a mechanical solid/liquid separation apparatus, by carrying out the solid/liquid separation under conditions under which the crystalline $NaOH.3.5H_2O$ is freed sufficiently of residual solution adhering to the surface for the sodium chloride content of the crystalline $NaOH.3.5H_2O$ obtained to be less than 100 mg per kg.

DETAILED DESCRIPTION OF THE INVENTION

In a preferred embodiment, the crystalline $NaOH.3.5H_2O$ is subjected to an additional purification step, which may include at least the superficial dissolution of the crystals, in combination with a solid/liquid separation step.

The $NaOH.3.5H_2O$ crystals thus obtained have a sodium chloride of less than 100 mg/kg, preferably less than 50 mg/kg.

The purifying action achieved by the process of the present invention is probably due to the fact that the contamination of the NaOH.3.5H$_2$O crystals is not present in the crystals themselves, for instance as a result of inclusions or solid solution formation with salts dissolved in the mother liquor, but is attributable to mother liquor adhering to the surface.

Suitable apparatuses for separating off the crystalline NaOH.3.5H$_2$O are known apparatuses for mechanical solid/liquid separation. The separation apparatus used is preferably a centrifuge, washing column or a filter. Suitable centrifuges are continuously or discontinuously operating centrifuges for separating solids from liquids, for example centrifuges, filter centrifuges, decanting, pusher or disk centrifuges. Preference is given to using a pusher centrifuge. Suitable filters are a belt filter, also customary filtration apparatuses such as pressure filters, vacuum filters and filter centrifuges, which can be operated continuously or batchwise. Preference is given to using a belt filter.

Conditions under which the solution residues adhering to the crystal surface are substantially removed are high g values and/or long separation times, when using a belt filter long separation times. Preferred separation times are from 10 to 45 seconds when using a pusher centrifuge and from 1 to 10 minutes when using a belt filter. The separation in the pusher centrifuge is preferably carried out at a centrifugal acceleration of from 600 to 1200 g.

The separation can be carried out at from 10 to 16° C., but the separation is preferably carried out at temperatures above the melting point of the NaOH.3.5H$_2$O crystals (about 15° C.).

The additional purification step can comprise washing the crystalline NaOH.3.5H$_2$O with water or with aqueous sodium hydroxide solution. When using an aqueous sodium hydroxide solution as washing liquid, it should have an NaCl content which is below the NaCl content of the mother liquor of the crystals. The washing liquor used is preferably an aqueous sodium hydroxide solution purified by the process described or a chloride-free sodium hydroxide solution prepared using the amalgam process.

The additional purification step can comprise complete dissolution and recrystallization of the NaOH.3.5H$_2$O crystals. In such a second crystallization step, it is possible to use the liquids mentioned above for washing the crystals as solvents. Complete dissolution can also comprise complete melting of the NaOH.3.5H$_2$O crystals without use of additional solvent.

The additional purification step can comprise the superficial melting of the crystalline NaOH.3.5H$_2$O in combination with a mechanical solid/liquid separation. The partial melting can be carried out by warming the crystals by simply leaving the crystals on the separation apparatus at temperatures above 15° C. Warming is preferably carried out by blowing-on steam.

Partial melting and separation of the crystals can be carried out simultaneously or in succession. The partial melting is preferably carried out simultaneously with the separation process.

A particularly good purification effect is achieved when the initial separation is carried out under conditions under which superficial melting of the crystals occurs. The particular purification action is presumably attributable to the fact that as a result of the partial melting the impurities originating from the solution residues adhering to the surface are dissolved in the molten outer crystal layers of the NaOH.3.5H$_2$O crystals and are rinsed away together with these in the separation process. The melting medium is at a temperature above the melting point and the separation is carried out at or below the melting point. In a preferred embodiment, the partial melting of the crystals is achieved by warming by blowing steam onto the separation apparatus during the separation process.

It is also possible to carry out a plurality of separation and purification steps in succession.

The starting solution used is an aqueous sodium hydroxide solution having an NaOH content of from 33 to 45% by weight, preferably about 38% by weight, based on the total weight of the aqueous sodium hydroxide solution. The amount of NaOH crystallized from this solution in the first purification step as NaOH.3.5H$_2$O is, based on the total amount of NaOH, preferably from 10 to 30% by weight.

The crystallization of the NaOH3.5H$_2$O from the supersaturated aqueous sodium hydroxide solution can be carried out by a process described in DE-A-26 16 242 or DE-A-24 26 282. The crystallization step is preferably induced by seed crystals.

The NaOH.3.5H$_2$O crystals obtained can have a sodium chloride content of less than 100 mg/kg, preferably less than 50 mg/kg, in particular 18–50 mg/kg. In the case where the aqueous sodium hydroxide solution contains sodium chlorate in addition to sodium chloride, the sodium chlorate content of the crystals can be below the detection limit of 10 mg/kg. The residual salt content can be determined titrimetrically or ion-chromatographically-/conductometrically. Melting of the crystals according to the present invention gives a particularly pure aqueous sodium hydroxide solution.

The process of the present invention leads to NaOH.3.5H$_2$O crystals having a particularly low NaCl content which is lower by a factor of about 10 than the NaCl content of the crystalline NaOH.3.5H$_2$O prepared by previous methods from sodium hydroxide solution obtained in the diaphragm process. The low content of less than 10 mg of strongly oxidizing sodium chlorate in the crystals according to the present invention is also particularly advantageous. The aqueous sodium hydroxide solution obtained from the crystals has a quality which is comparable with the quality of sodium hydroxide solution prepared by the amalgam process.

The process according to the invention is particularly suited for purifying caustic soda from the diaphragm process.

The invention is illustrated by the following example.

EXAMPLE

A 1 l capacity laboratory crystallizer containing NaOH.3.5H$_2$O seed crystals is supplied continuously at a rate of 2 kg/h with a 38% by weight strength sodium hydroxide solution which has a sodium chloride content of 0.7% by weight and a sodium chlorate content of 650 mg/kg and has been supercooled to 5° C., ie. 10° C. below its crystallization point, before entry into the crystallizer. After entry into the crystallizer, crystal formation occurs until the solution is no longer supersaturated. The heat of crystallization warms the suspension formed to 15° C. After 2 hours, the suspension is separated by centrifuging at 15° C. for 30 seconds on a laboratory centrifuge at 700 g. This gives 200 g of crystals which are slurried at 20° C. with 200 g of a sodium hydroxide solution having a residual chloride content of less than 25 mg/kg and a residual chlorate content of less than 20 mg/kg. The crystals are subsequently centrifuged off again as described above.

This gives 150 g of crystals having a sodium chloride content of 40 mg/kg and a sodium chlorate content of less than 10 mg/kg.

We claim:

1. A process for preparing crystalline $NaOH \cdot 3.5H_2O$ comprising the steps of crystallizing $NaOH \cdot 3.5H_2O$ from an aqueous sodium hydroxide solution which contains sodium chloride and is saturated in respect of $NaOH \cdot 3.5H_2O$ and separating the formed crystals from the solution using a mechanical solid/liquid separation apparatus, wherein the solid/liquid separation is carried out under conditions to obtain $NaOH \cdot 3.5H_2O$ crystals which are substantially free of residual solution adhering to the surface and having a sodium chloride content of less than 50 mg per kg.

2. The process defined in claim 1, wherein the process further comprises an additional purification step which comprises washing the separated $NaOH \cdot 3.5H_2O$ crystals.

3. The process defined in claim 2, wherein water or aqueous sodium hydroxide solution having an NaCl content which is below the NaCl content of the aqueous sodium hydroxide solution separated off is used for washing.

4. The process of claim 1, which further comprises subjecting the $NaOH \cdot 3.5H_2O$ crystals to an additional purification step, which is a superficial melting or a superficial dissolution of the $NaOH \cdot 3.5H_2O$ crystals, in combination with a further mechanical solid/liquid separation.

5. The process defined in claim 4, wherein the additional purification step comprises the superficial melting of the $NaOH \cdot 3.5H_2O$ crystals in combination with the mechanical solid/liquid separation.

6. The process defined in claim 1, wherein the process further comprises an additional purification step which comprises a complete melting or dissolution and a recrystallization of $NaOH \cdot 3.5H_2O$ crystals.

7. The process defined in claim 1, wherein the aqueous sodium hydroxide solution contains sodium chlorate in addition to sodium chloride and the $NaOH \cdot 3.5H_2O$ crystals has a sodium chlorate content of less than 10 mg per kg.

8. The process defined in claim 1, wherein the mechanical separation apparatus used is a centrifuge or a belt filter.

9. The process defined in claim 1, wherein the NaOH content of the aqueous sodium hydroxide solution used is from 33 to 45% by weight, based on the total weight of the aqueous sodium hydroxide solution.

* * * * *

UNITED STATES PATENT AND TRADEMARK OFFICE
CERTIFICATE OF CORRECTION

PATENT NO. : 6,113,657
DATED : September 5, 2000
INVENTOR(S) : Schlaefer et al.

Page 1 of 1

It is certified that error appears in the above-identified patent and that said Letters Patent is hereby corrected as shown below:

Delete "$NaOH.3.5H_2O$" and Substitute --$NaOH\,3.5H_2O$-- at the following places:

Abstract
Lines 1, 2, 4, 8, 10, 11 and 17;

Column 5,
Claim 1, lines 5,6,8 and 12;
Claim 2, line 17;
Claim 4, line 23;

Column 6,
Claim 4, line 2;
Claim 5, line 6;
Claim 6, line 11;and
Claim 7, line 14.

Signed and Sealed this

Seventeenth Day of July, 2001

Attest:

NICHOLAS P. GODICI
Attesting Officer
Acting Director of the United States Patent and Trademark Office